US009378590B2

(12) United States Patent
Lee et al.

(10) Patent No.: US 9,378,590 B2
(45) Date of Patent: Jun. 28, 2016

(54) AUGMENTED REALITY AUCTION PLATFORM

(71) Applicant: MICROSOFT TECHNOLOGY LICENSING, LLC, Redmond, WA (US)

(72) Inventors: Kyungsuk David Lee, Bellevue, WA (US); Alexandru Balan, Redmond, WA (US); Mark J. Finocchio, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 176 days.

(21) Appl. No.: 13/868,857

(22) Filed: Apr. 23, 2013

(65) Prior Publication Data
US 2014/0313225 A1 Oct. 23, 2014

(51) Int. Cl.
*G06T 19/00* (2011.01)
*G06Q 30/00* (2012.01)
*G03H 1/00* (2006.01)
*G09G 3/00* (2006.01)

(52) U.S. Cl.
CPC ............ *G06T 19/006* (2013.01); *G03H 1/0005* (2013.01); *G06Q 30/00* (2013.01); *G09G 3/003* (2013.01); *G09G 2340/12* (2013.01); *G09G 2340/14* (2013.01); *G09G 2354/00* (2013.01)

(58) Field of Classification Search
CPC .... G06T 19/006; G06Q 30/00; G03H 1/0005; G09G 3/003; G09G 2354/00; G09G 2340/12; G09G 2340/14
USPC ..................................................... 345/7, 633
See application file for complete search history.

(56) References Cited

U.S. PATENT DOCUMENTS

| | | | |
|---|---|---|---|
| 8,175,950 | B1 | 5/2012 | Grebeck et al. |
| 2003/0135460 | A1 | 7/2003 | Talegon |
| 2006/0265493 | A1 | 11/2006 | Brindley et al. |
| 2006/0271281 | A1 | 11/2006 | Ahn et al. |
| 2010/0138286 | A1 | 6/2010 | Steinberger et al. |
| 2010/0332331 | A1* | 12/2010 | Etchegoyen ................ 705/14.69 |
| 2011/0071899 | A1 | 3/2011 | Robertson et al. |
| 2011/0213664 | A1 | 9/2011 | Osterhout et al. |
| 2011/0221657 | A1* | 9/2011 | Haddick et al. .................... 345/8 |
| 2012/0310729 | A1 | 12/2012 | Dalto et al. |
| 2013/0083011 | A1 | 4/2013 | Geisner et al. |
| 2013/0083018 | A1 | 4/2013 | Geisner et al. |
| 2014/0204117 | A1* | 7/2014 | Kinnebrew et al. ........... 345/633 |
| 2014/0278944 | A1* | 9/2014 | Kash et al. ................. 705/14.46 |

OTHER PUBLICATIONS

Najafi-Asadolahi, et al., "Cost-Per-Click Pricing for Display Advertising", Retrieved at <<http://sami-najafi.com/research/CPC-Pricing-for-Display-Advertising.pdf>>, In Journal of Manufacturing & Service Operations Management, Retrieved Date: Feb. 9, 2013, pp. 52.

ISA International Search Report and Written Opinion Issued in PCT/US2014/34740, Feb. 19, 2015, United States, 7 Pages.

European Patent Office, Supplementary European Search Report issued in Application No. 14725878.4, Mar. 17, 2016, Germany, 4 pages.

* cited by examiner

*Primary Examiner* — Xiao Wu
*Assistant Examiner* — Chong Wu
(74) *Attorney, Agent, or Firm* — Dan Choi; Judy Yee; Micky Minhas (57) ABSTRACT

An augmented reality submission includes a hologram to virtually augment a world space object and a compensation offer for presenting the hologram to a viewer of the world space object. The augmented reality submission is selected as a winning submission if the submission satisfies a selection criteria.

18 Claims, 8 Drawing Sheets

AUGMENTED REALITY AUCTION PLATFORM

BACKGROUND

An augmented reality computing device may display virtual or holographic objects to augment a world space object. For example, a hologram may be overlaid on an environment that includes real objects and real-world surfaces, e.g., buildings, signs, etc. In one example, the hologram may be viewed through a head-mounted display device that may include a see-through display system configured to display images yet not obscure a real-world background viewable through the see-through display system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to auctioning world space for virtual augmentation are disclosed. In one embodiment, an augmented reality submission including a hologram to virtually augment a world space object and a compensation offer for presenting the hologram to a viewer of the world space object is received. The augmented reality submission is selected as a winning submission if the submission satisfies a selection criteria.

DETAILED DESCRIPTION

The present disclosure relates to virtual augmentation of real world space. More particularly, the present disclosure relates to an augmented reality auction platform that enables virtual space that is locked to a world space object to be rented or sold in an efficient, fair, and automated manner that may be easily scaled for mass consumption. A hologram or virtual object may be selectively or temporarily presented in the virtual space to a viewer according to various selection criteria and/or other viewing parameters. For example, these rented/sold virtual spaces can be used for purposes such as advertisements, displaying local information, emergency message broadcasting, art, special events, etc.

The augmented reality auction platform may provide a centralized system configured to automate the process of receiving submissions for bidding on, and renting/selling world locked virtual space, as well as identifying winning submissions and delivering holograms to augmented reality devices for presentation in the rented/sold world locked virtual spaces. In particular, the augmented reality auction platform may be configured to determine winning bids depending on various selection criteria. In one example, a bid submission may include a compensation offer and a submission may be selected as a winning submission if the compensation offer is greater than all other compensation offers for causing other holograms to be presented to a viewer of a world space object.

In some embodiments, the augmented reality auction platform may be configured to collect and store statistics to track auction behavior as well as hologram utilization via viewer consumption once a hologram is provided to an augmented reality device. In some embodiments, the augmented reality auction platform may be configured to utilize the tracking information to detect abusive practices (e.g., inflating bidding, renting space to block other holograms, etc.) that may corrupt the auction process. The augmented reality auction platform may facilitate various different rental and sales models, and compensation may be calculated based on tracked viewer consumption information.

In one example, a see-through display system, e.g., a head-mounted display (HMD) device or other near-eye display device, may be used to present an augmented reality view of a real world background scene including a world space objet to a viewer. A world space object may take any suitable form without departing from the scope of the present disclosure. In one example, a world space object may include a portion of a real world object, such as a surface of a physical object or a portion of multiple physical objects. In another example; a world space object may include a real world space. In some cases, the real world space may be defined by designated dimensions or real world coordinates. In some cases, the real world space may be located at a fixed location in the real world regardless of the position of an augmented reality device. In some cases, the real world space may be fixed relative to an augmented reality device, and may change locations as the location of the augmented reality device changes to remain fixed relative to the augmented reality device.

A hologram may be presented in the see-through display system such that it is aligned with or overlaid on the world space object. The hologram may take any suitable form without departing from the scope of the present disclosure. Non-limiting examples of a hologram may include a 2D image, a 2D animation, a 3D image, and a 3D animation. In one example, a hologram that is aligned with/overlaid on a real world space may be referred to as a world locked hologram. In another example, a hologram that is aligned with/overlaid on a floating space that is a fixed distance from a display system may be referred to as a device locked hologram. In yet another example, a hologram that is aligned with/overlaid on a floating space that is a fixed distance from a user may be referred to as a user locked hologram. It is to be understood that each of these examples may be classified as a world space object to which a hologram may be locked.

In some embodiments, a hologram may further include other sensory components, such as audio, tactile, olfactory, etc. Such an augmented reality environment may include various virtual and real objects with which a viewer may interact.

Figure 1:
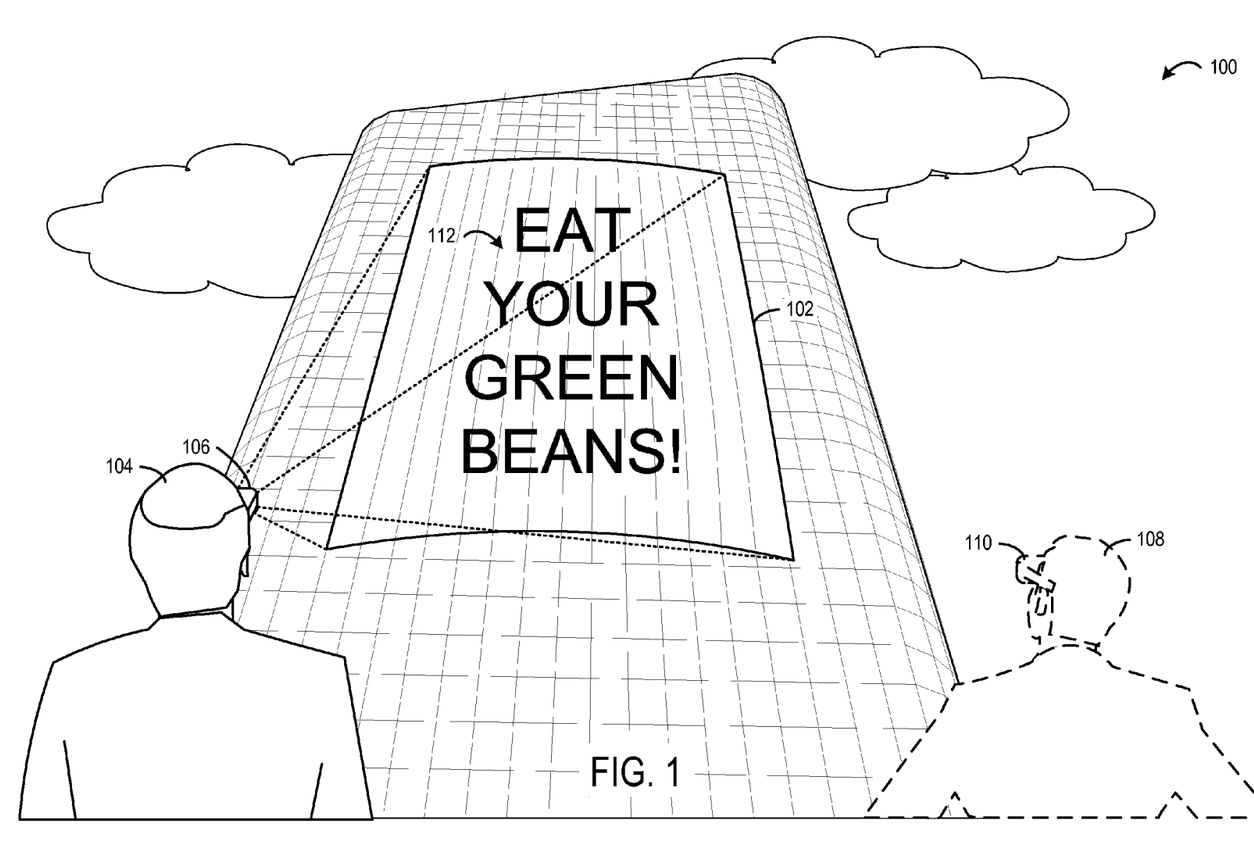
FIG. 1 shows an example use environment for an augmented reality computing system from the perspective of a first viewer.
Figure 2:
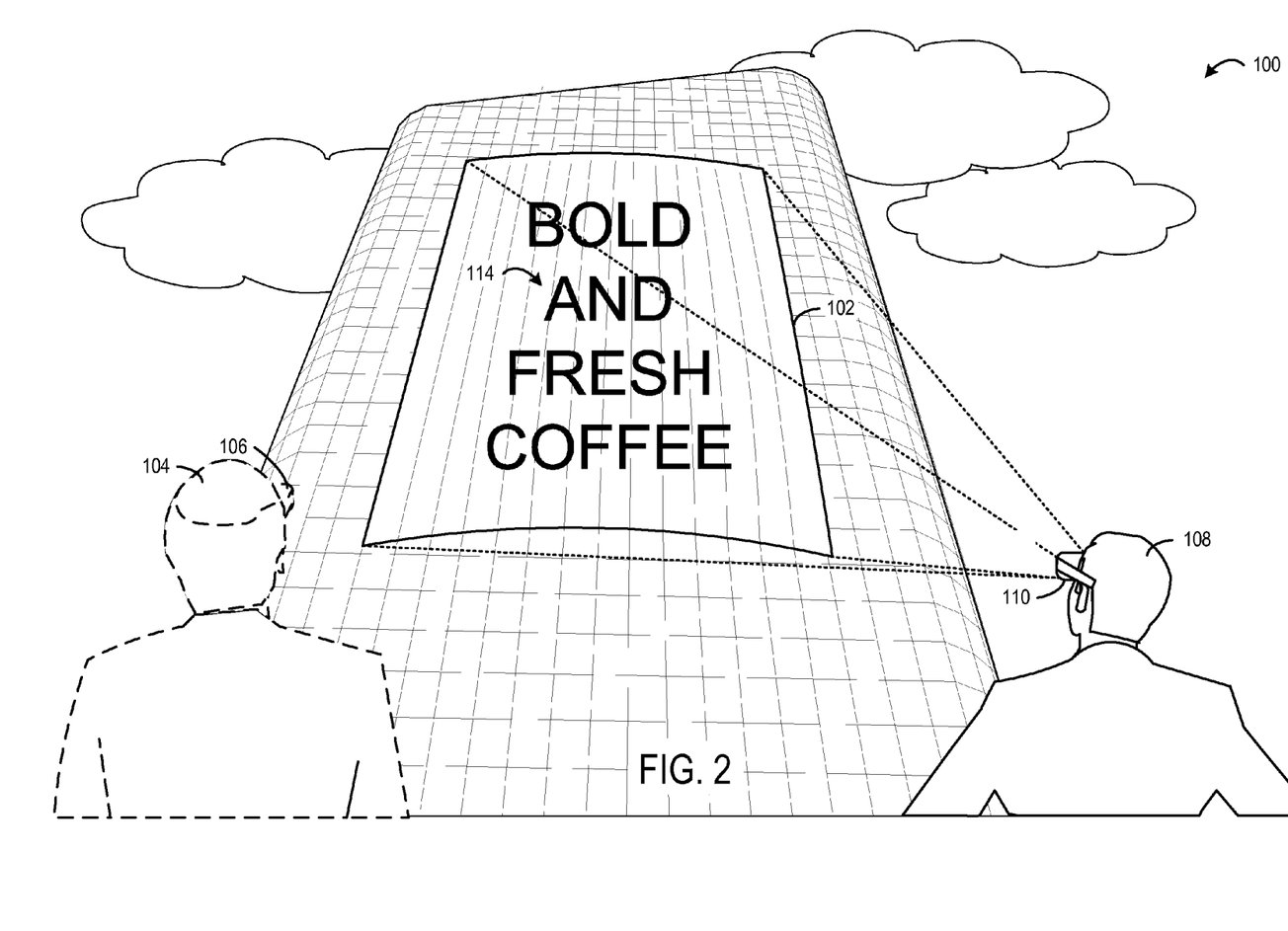
FIG. 2 shows the use environment of FIG. 1 from the perspective of a second viewer.

FIGS. 1 and 2 show an example embodiment of a use environment 100 for a world space object 102 that may be augmented by various holograms. The use environment 100 takes the form of a view of a side of a building. It should be understood that use environment 100 is presented for the purpose of example, and that a use environment may take any other suitable form. A first viewer 104 is viewing the side of the building through an augmented reality computing device in the form of a see-through head-mounted display device 106. A second viewer 108 is also viewing the side of the building through an augmented reality computing device in the form of the see-through head-mounted display device 110. The side of the building includes the world space object 102 (e.g., a designated portion of the building to which a virtual space is mapped) that may be virtually augmented by presentation of a hologram in a virtual space on the head-mounted display devices 106 and 110. The virtual space is locked to the world space object through a field of view of the head-mounted display devices.

Different holograms may be locked to the world space object 102 for different viewers via different augmented reality devices based on various viewing parameters and/or other hologram selection criteria. FIG. 1 depicts an augmented reality view of the world space object 102 from the perspective of the first viewer 104 through the field of view of the see-through head-mounted display device 106. The first viewer is presented with a first hologram 112 that is locked to the world space object 102. In particular, the first hologram is an advertisement for green beans that states, "EAT YOUR GREEN BEANS!" For example, the first hologram may be particularly selected for presentation to the first viewer 104 based on viewing parameters of the first viewer that may be determined from consumption information about the first viewer gathered by the augmented reality auction computing system as will be discussed in further detail below. Since the first hologram is targeted at the first user, the first hologram may not be presented to the second user.

FIG. 2 depicts an augmented reality view of the world space object 102 from the perspective of the second viewer 108 through the field of view of the see-through head-mounted display device 110. The second viewer is presented with a second hologram 114 that is locked to the world space object 102. In particular, the first hologram is an advertisement for coffee that states, "BOLD AND FRESH COFFEE." For example, the second hologram may be particularly selected for presentation to the second viewer 108 based on viewing parameters of the second viewer that may be determined from consumption information about the second user gathered by the augmented reality auction computing system as will be discussed in further detail below. Since the second hologram is targeted at the second user, the second hologram may not be presented to the first user.

It is to be understood that the first hologram may be presented to the first user at the same time that the second hologram is presented to the second user. It is to be understood that this use environment is presented as merely one example and numerous other example uses are enabled by the augmented reality auction computing system. For example, the same hologram may be presented to both viewers when they view the same world space object. Further, the viewers may view different holograms when viewing other world space objects.

Furthermore, although the augmented reality device is depicted as a see-through head mounted display device, it is to be understood that the augmented reality device may take any suitable form. For example, the augmented reality device may include a camera, a tablet, a smartphone, a near-eye device, a mobile computing device, etc.

Figure 3:
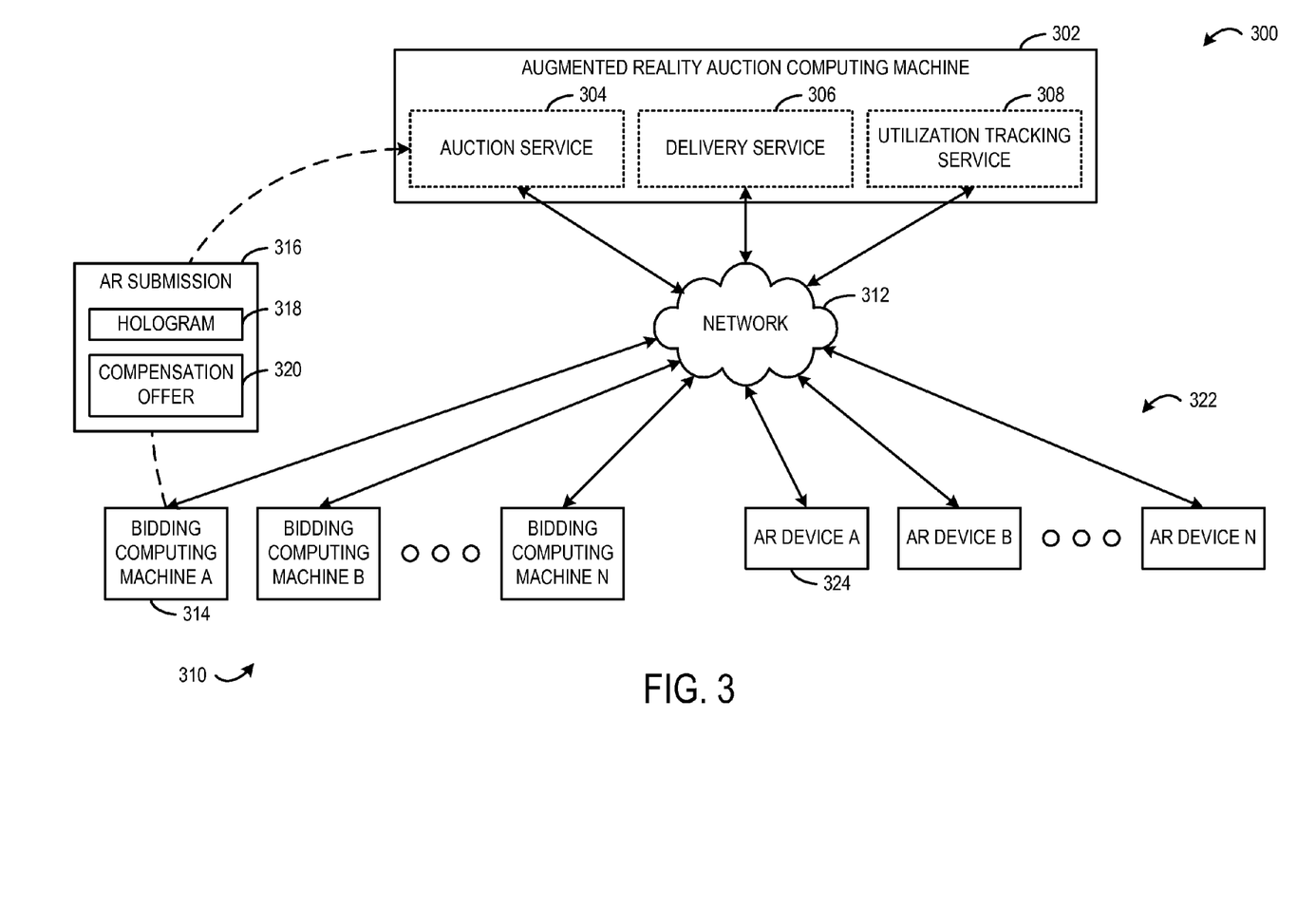
FIG. 3 schematically shows an augmented reality computing system according to an embodiment of the present disclosure.

FIG. 3 schematically shows an augmented reality computing system 300 according to an embodiment of the present disclosure. The augmented reality computing system 300 includes an augmented reality auction computing machine 302 configured to rent/sell world locked virtual space to a plurality of bidding computing machines 314 in an automated fashion. The world locked virtual space may be mapped to world space objects on which holograms may be presented to viewers via a plurality of augmented reality devices 322. The augmented reality auction computing machine 302 may include an auction service 304, a delivery service 306, and a tracking service 308. Although these services are depicted as separate entities, it is to be understood that, in some embodiments, the functions of these separate services may be performed by a single service.

The auction service 304 may be configured to receive a plurality of augmented reality submissions from a plurality of bidding computing machines 310 (e.g., BIDDING COMPUTING MACHINES A-N) via a network 312, such as the Internet. A bidding computing machine 314 may represent any suitable entity or party interested in renting/buying world locked virtual space mapped to a world space object to present a hologram. For example, a hologram may be presented on a world space object for purposes such as advertisements, displaying local information, emergency message broadcasting, art, special events, or any other suitable purpose.

Each augmented reality submission 316 may include a hologram 318 to virtually augment a world space object and a compensation offer 320 for presenting the hologram to a viewer of the world space object. The hologram 318 may be any suitable virtual content for presentation on a world space object. The compensation offer 320 may indicate any suitable form of compensation for presenting the hologram on the worlds space object.

In one example, the bidding computing machine 314 or bidder may be configured to upload a hologram, such as 3D content, to the auction service 304. The bidder may place the hologram on a selected world space object. The bidder may also input viewing parameters or other selection criteria for the submission.

The auction service 304 may be configured to identify a winning augmented reality submission for the world space object. The auction service 304 may select an augmented reality submission as the winning augmented reality submission if the augmented reality submission satisfies various selection criteria. It is to be understood that the selection criteria may take any suitable form.

In one example, a winning bid or submission is calculated by weighting each bid by a plurality of variables that are tunable by the auction service (e.g., platform administrators and/or internal algorithms that may evolve over time). An optimization algorithm may select a submission that produces a maximum compensation value. It is to be understood that value may include non-monetary values such as esthetic appeal, longevity of bids, density, minimal interference to normal life activities, etc. In other words, a submission may satisfy the selection criteria if a corresponding compensation offer is greater than all other compensation offers for causing other holograms to be presented to a viewer of a world space object.

Non-limiting examples of variables or criteria for selecting a winning submission may include a hologram's complexity (such as a number of vertices, triangles, textures, texture sizes, attached animations, etc); location (such as a world locked location in 3D space); time/length (e.g., longer bids may be preferred over shorter bids with higher prices or vice versa); bid price/time (such as a bidder's price that is calculated in some form of currency/time); minimum bid (may be implemented by the auction service to reduce a possibility of abuse (e.g., virtual littering of holograms)); size (such as an amount of world locked space a hologram occupies); sound level; animation range, such as a space the hologram occupies while moving around in space and time; brightness (e.g., brighter holograms may consume more battery power on some devices); bulk purchase amount (e.g., discount for high volume bidders); a viewer's hardware resources (such as a level of CPU/GPU/Network/Battery resources that a viewer can expend without lowering a quality of hologram consumption experience), and/or any other suitable variable or selection criteria. Variables may be used with fuzzy logic that weights different variables by different amounts.

In one example, a hologram of a winning submission may be presented to every viewer of a world space object. In another example, a hologram of a winning submission may be presented to viewers of a world space object located at a designated position/distance. In another example, a winning submission may be presented to only a designated number of viewers of a world space object. It is to be understood that, in some cases, a hologram of a winning submission may be presented to different viewers of a world space object depending on different conditions.

In some embodiments, a submission may include selection criteria that may constrain presentation of a corresponding hologram to certain conditions. For example, a submission may include time parameters, viewing parameters, and audience parameters that may determine conditions for presenting a hologram to a viewer of a world space object.

The delivery service 306 may be configured to deliver holograms to the plurality of augmented reality devices (e.g., AR DEVICES A-N) via the network 312 for presentation to a viewer of a world space object to which the hologram is locked. An augmented reality device 324 may represent a viewer at a particular location in world space. The augmented reality device 324 may include any suitable device for presenting a hologram or other virtual content to a viewer without departing from the scope of the present disclosure. For example, the augmented reality device may include a see-through head mounted display, a mobile computing device, a tablet, a smartphone, etc.

In one example, the delivery service 306 may be configured to acknowledge that a world space object is in a field of view of an augmented reality device. For example, the augmented reality device 324 may send an indication to the delivery service that the world space object is in the field of view of the augmented reality device. In some embodiments, the field of view may be inferred based on a reported location and orientation of the augmented reality device. The delivery service 306 may be configured to identify a winning augmented reality submission for the world space object. The winning augmented reality submission may include a hologram to virtually augment the world space object. In some embodiments, the delivery service 306 may communicate with the auction service 304 to identify the winning submission. In some embodiments, the delivery service 306 may select a winning submission from a plurality of submissions for the world space object. Further, the delivery service 306 may be configured to provide the hologram from the winning augmented reality submission to the augmented reality device 324 for presentation to the viewer.

In one example, the augmented reality device 324 may be configured to send a current location (virtual or real) to the delivery service 306. The augmented reality device 324 may be configured to receive and display world locked content, such as a hologram to the viewer. If the current location of the augmented reality device 324 changes beyond a threshold or the delivery service requests an update, the augmented reality device 324 may be configured to send an updated location and receive corresponding content to display to the viewer.

The utilization tracking service 308 may be configured to collect consumption information indicating hologram utilization from the plurality of augmented reality devices 322. Further, the utilization tracking service 308 may be configured to report the consumption information to the winning bidders of the plurality of bidding computing machines 310. In particular, the tracking service 308 may formulate statistics from the consumption information to inform the winning bidders on the effectiveness of presentation of holograms in their rented/owned world locked virtual space.

Non-limiting examples of consumption information and/or statistics may include an amount of time a hologram is viewed; location heat map of where a hologram is viewed from; a minimum, maximum, mean, and/or median time a hologram is viewed per viewing event, a minimum, maximum, mean, and/or median number of people that view a hologram during a specified time frame; demographic distribution of viewers who view a hologram; time of day distribution of when viewers view a hologram; a distribution of devices a hologram is viewed from; and/or any other suitable statistic.

In some embodiments, the tracking service 308 may be configured to collect bidding information from the plurality of bidding computing machines and formulate bidding statistics. Further, the utilization tracking service 308 may be configured to report the bidding information and statistics to the plurality of bidding computing machines 310 to inform the bidders of the effectiveness of the bids (e.g., bids/win, average compensation offer/bid, etc.).

In some embodiments, the auction service 304 may be configured to detect abuse of bidding computing machines and/or augmented reality devices using various metrics. In one example, the auction service 304 may include a machine learning algorithm that is trained over time to link reported abuses to characteristics of a way in which an abuse is performed. Non-limiting examples of abuse metrics that may be used to detect abuse include 3D space overlap where bidders intentionally place small holograms where other bidders are likely to place large holograms with the intention of blocking a competitor from showing their hologram; detecting if a hologram is purposefully blocking a view of other holograms by analyzing a blockage percentage from all viewed locations; detecting intolerable content with size, brightness, contrast, sound, motion, etc. that is outside a comfortable consumption level of a viewer; detecting abnormal time length (e.g., short bursts for frequent periods of time to interfere with other holograms during high viewing time and areas); detecting placement of holograms in high risk areas (e.g., middle of roads and busy intersections where the content can interfere with walking/driving/flying/etc.); detecting frequent abusers that are frequently flagged by others as an abuse case; etc.

In some embodiments, selection criteria may include one or more abuse parameters or metrics, and the auction service 304 may be configured to select a submission as a winning submission only if none of the one or more abuse parameters are violated by the submission. In some embodiments, selection criteria may include an abuse threshold (e.g., a designated number of abuse cases that a bidder is flagged with), and the auction service 304 may be configured to select a submission as a winning submission only if the submission does not exceed the abuse threshold.

In one example, the augmented reality auction computing machine may receive new bids from bidders that are provided by an augmented reality submission interface. The augmented reality auction computing machine may pre-calculate a set of contents to be viewed around the space and time of new bids. For each new connection with an augmented reality device, the augmented reality auction computing machine may receive a current location and provide a set of holograms from winning submissions to view based on the current location. For each existing connection with an augmented reality device, if a location update is received by the augmented reality auction computing machine, then the augmented reality auction computing machine may send the change in holograms to the augmented reality device to view from the new location.

Figure 4:
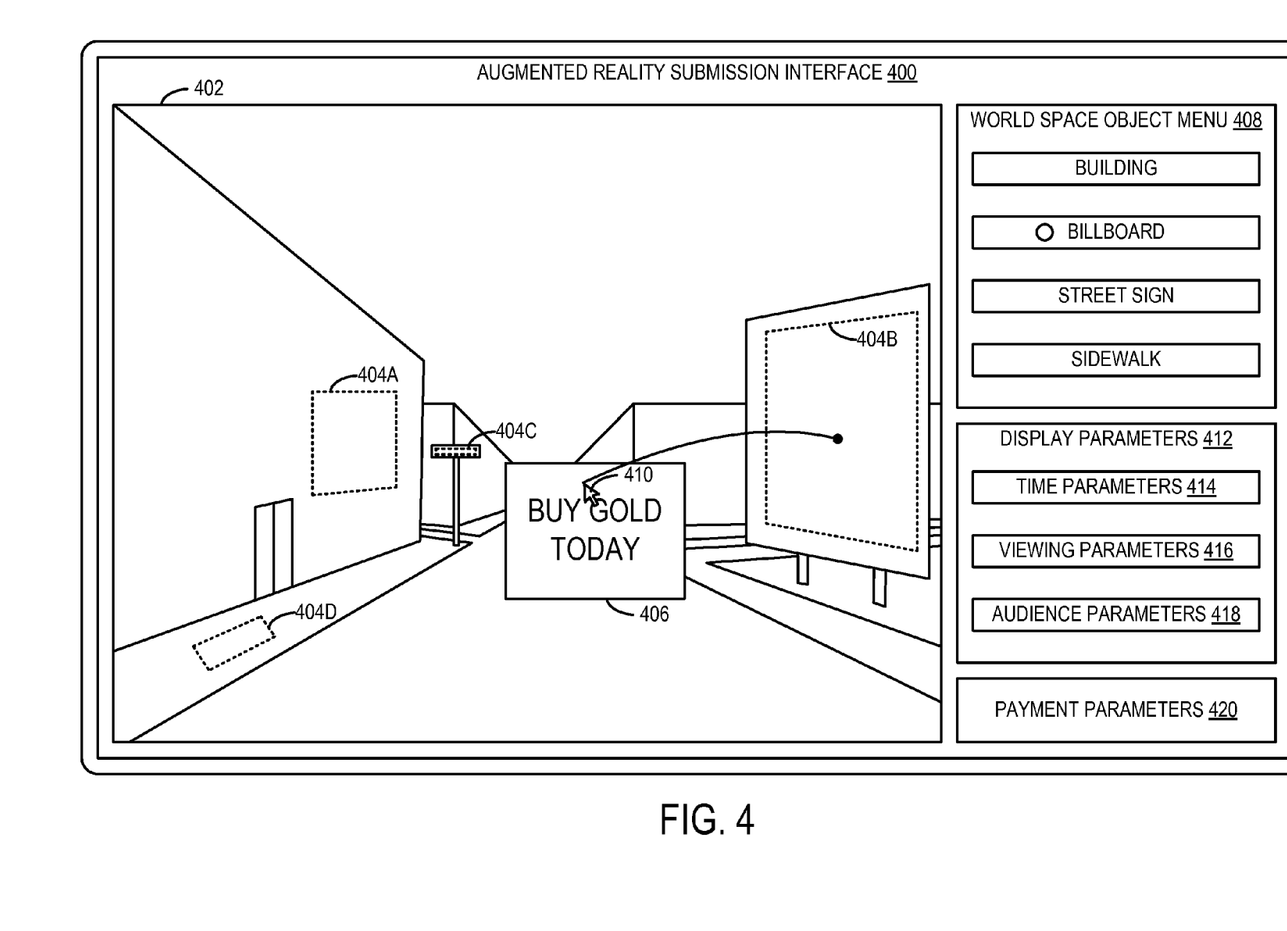
FIG. 4 schematically shows an augmented reality submission interface according to an embodiment of the present disclosure.

FIG. 4 shows a schematic depiction of an augmented reality submission interface 400 (herein referred to as "interface") according to an embodiment of the present disclosure. For example, the interface 400 may be presented on a bidding computing machine (e.g., bidding computing machine 314 in FIG. 4) to facilitate generation of an augmented reality submission for renting/buying a world locked virtual space. A hologram of the augmented reality submission may be uploaded to the interface 400 and virtually placed on a virtual representation of a selected world space object.

The interface 400 may include a virtual model 402 of a real world. In one example, the virtual model may be an exact copy of the real world. The virtual model 402 may include a virtual simulation of various world space objects 404A-D that are eligible for selection. A hologram 406 may be placed on a selected world space object for an augmented reality submission. In the illustrated embodiment, eligible world space objects 404A-D are indicated by dotted lines, and are listed in a world space object menu 408. For example, the eligible world space objects include a side of a building, a billboard, a street sign, and a sidewalk that may be augmented with a hologram (e.g., world locked holograms). It is to be understood that these world space object are provided merely as examples, and any suitable space may be a world space object. For example, a world space object may include a designated position that is relative to an augmented reality device and augmented with a hologram (e.g., device locked hologram), such as a floating space that is offset four feet away from an augmented reality device. The floating space may not be associated with any particular real world object and may move as the augmented reality device moves to maintain the four foot offset. As another example, a world space object may include a designated position that is relative to a user and augmented with a hologram (e.g., a user locked hologram).

The interface 400 may include a placement tool 410 for fitting the hologram 406 to a virtual simulation of an eligible world space object. The fitting tool and the virtual model may provide a preview of the hologram to help a bidder decide which world locked virtual space to rent/buy. The placement tool provides one way to indicate that a world space object is found or selected for an augmented reality submission. In the illustrated embodiment, the placement tool includes a cursor that can be used to select the hologram (e.g., by clicking and holding a mouse or tapping with a touch input) and place the hologram on a desired virtual representation of the world space object in the virtual model.

The world space object menu 408 may provide another way to indicate selection of a world space object for an augmented reality submission. The world space object menu 408 includes a plurality of eligible world space objects. In some cases, by selecting one of the eligible world space objects from the world space object menu, the hologram 406 may be locked to the virtual representation of the selected world space object in the virtual model 402. In this way, the augmented reality submission may include an indication of the world space object selected from a menu of the eligible world space objects.

The interface 400 may include display parameters 412 that may act as filters for selecting a world space object (e.g., instead of directly selecting a world space object from the menu or the virtual model), and may define selection criteria for the augmented reality submission. In other words, the display parameters 412 may act as tuning variables for presenting a hologram to a viewer of a world space object. The display parameters 412 may include time parameters 414, viewing parameters 416, and audience parameters 418.

The time parameters 414 may define when a hologram is presented to a viewer of a world space object. In some embodiments, the time parameters may include specific time slots, such as a calendar style interface that allows a bidder to choose a time slot (e.g., down to a millisecond of presentation time). The time parameters may include a date range, a time range, a repeating presentation schedule, etc. For example, the time parameters may be used to specify that a hologram would be presented to a viewer Monday-Friday. In another example, a hologram that advertises a particular shop may only be presented when the shop is open. It is to be understood that the time parameters may include any suitable time or date defining mechanism without departing from the scope of the present disclosure.

The viewing parameters 416 may define one or more of a distance, direction, position, or viewing angle at which a hologram is presented to a viewer. For example, the viewing parameters may specify a minimum and maximum distance between a viewer and a world space object at which a hologram may be presented. The viewing range may be specified because the bidder may not want to pay when the hologram is too far to be recognizable or too close to be able to see in its entirety. Likewise, a bidder may want to limit their bid to a certain viewing angles. For example, if a hologram is on a billboard that is mounted on a wall, then a viewer may be confused by seeing the hologram from the other side of the wall.

The audience parameters 418 may define a target audience to view a hologram. For example, the audience parameters may include an age, sex, profession, interest, or other demographic characteristic of a viewer. In one example, a hologram may only be presented to viewers that match characteristics of the target audience as defined by the audience parameters. For example, an R-rated movie preview may only be shown to viewers 17 years or older.

The interface 400 may include payment parameters 420 that define a payment model for presenting a hologram to a viewer of a world space object. For example, the payment parameters may specify that payment is made according to a pay-per-view model, a pay-per-interaction model (e.g., a viewer touches a hologram), and a pay-per-viewing time model (e.g., time spent watching streaming content).

Although discussion has been directed toward auctioning world locked virtual space for presenting holograms locked to world space objects, such as through a see-through head mounted display, it is to be understood that the auctioning of world locked virtual space may be broadly applicable to virtual space. For example, the herein described auction system may be configured to auction world locked virtual space that corresponds to a virtual representation of the real world or another virtual model. For example, virtual space on a virtual representation of a billboard presented in a virtual game world may be auctioned, and a hologram may be presented to a player of the game.

Figure 5:
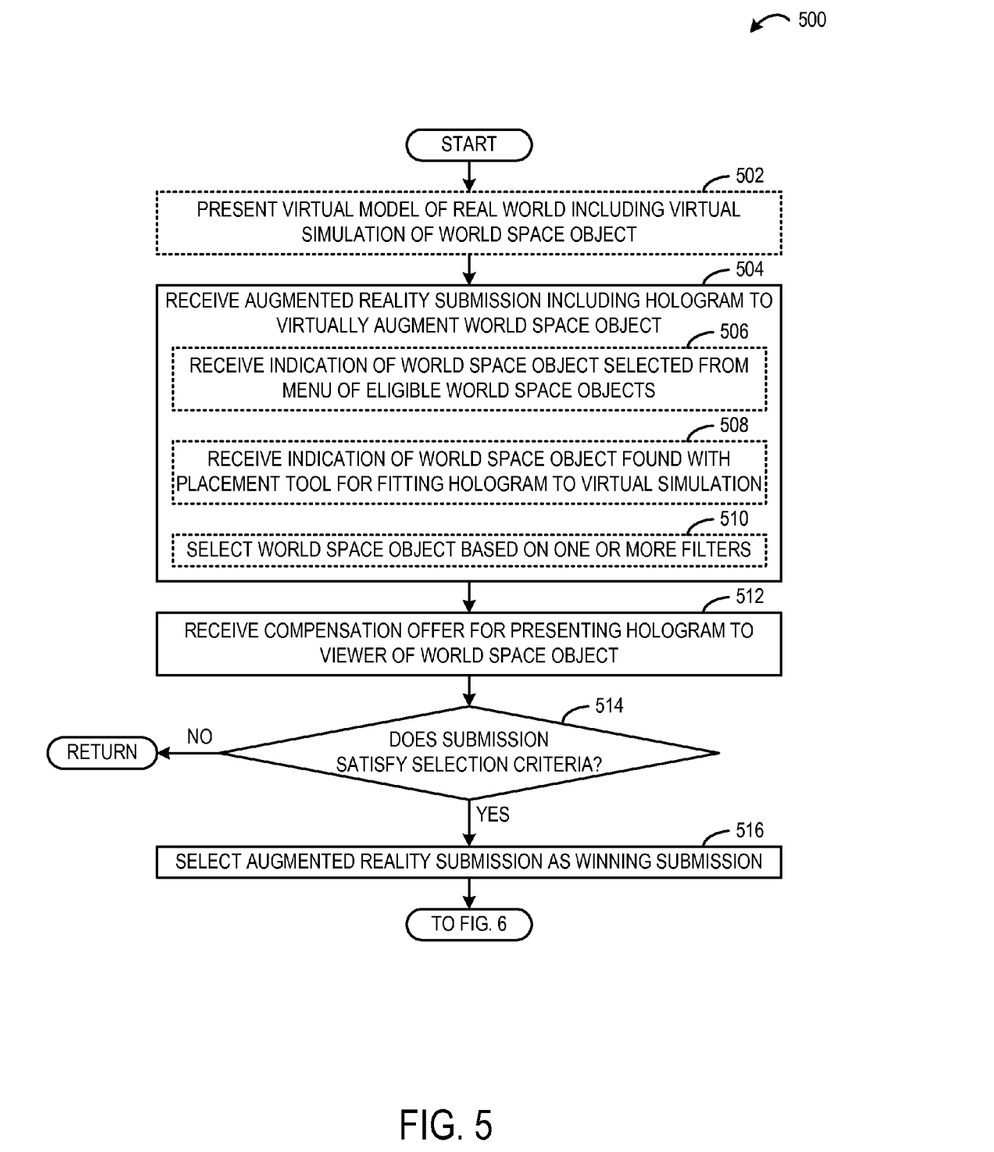
FIGS. 5 and 6 show a method of auctioning world space for virtual augmentation according to an embodiment of the present disclosure.
Figure 6:
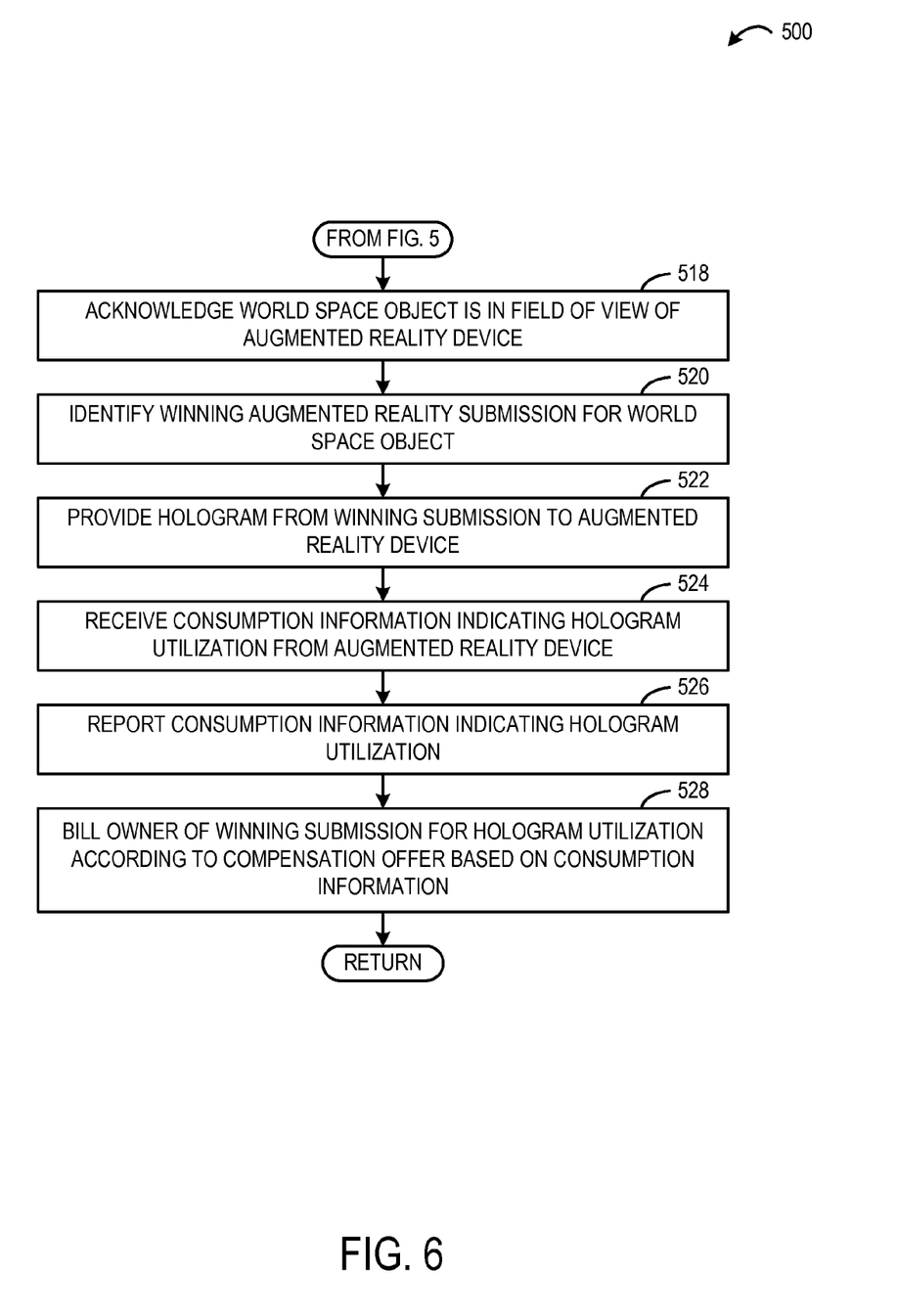

FIGS. 5 and 6 show a method 500 of auctioning world space for virtual augmentation according to an embodiment of the present disclosure. For example, the method may be performed by the augmented reality auction computing machine 302 shown in FIG. 3.

At 502, the method 500 may optionally include presenting a virtual model of a real word including a virtual simulation of a world space.

At 504, the method 500 may include receiving an augmented reality submission including a hologram to virtually augment a world space object.

At 506, receiving the augmented reality submission may include receiving an indication of the world space object selected from a menu of eligible world space objects (e.g., menu 408 shown in FIG. 4).

At 508, receiving the augmented reality submission may include receiving an indication of the world space object found with a placement tool (e.g., placement tool 410 shown in FIG. 4) for fitting the hologram to the virtual simulation of the world space object in the virtual model.

At 510, receiving the augmented reality submission may include selecting the world space object based on one or more filters (e.g., display parameters 412 shown in FIG. 4).

At 512, the method 500 may include receiving a compensation offer for presenting the hologram to a viewer of the world space object.

At 514, the method 500 may include determining whether the augmented reality submission satisfied selection criteria for selecting a winning augmented reality submission. Selecting a winning augmented reality submission based on selection criteria will be discussed in further detail below with reference to method 700 shown in FIG. 7. If it is determined that the augmented reality submission satisfies the selection criteria, then the method 500 moves to 516. Otherwise, the method 500 returns to other operations (e.g., receiving another submission).

At 516, the method 500 may include selecting the augmented reality submission as a winning submission. The augmented reality submission may be selected as the winning submission if the submission satisfies the selection criteria.

At 518 of FIG. 6, the method 500 may include acknowledging a world space object is in a field of view of an augmented reality device.

At 520, the method 500 may include identifying a winning augmented reality submission for the word space object. The winning augmented reality submission may include a hologram to virtually augment the world space object.

At 522, the method 500 may include providing the hologram from the winning augmented reality submission to the augmented reality device.

At 524, the method 500 may include receiving consumption information indicating hologram utilization. For example, the consumption information may be received from the augmented reality device.

At 526, the method 500 may include reporting consumption information indicating hologram utilization. For example, the consumption information may be reported to bidding computing machines of winning augmented reality submissions.

At 528, the method 500 may include billing an owner of the winning augmented reality submission according to a compensation offer based on the consumption information. For example, the compensation offer may include one or more of a pay-per-view model, a pay-per-interaction model, and a pay-per-viewing time model.

The above described method may be performed to enable world locked virtual spaces to be rented/sold in an efficient, fair, and automated manner so that holograms may be effectively presented to viewers of world space objects.

Figure 7:
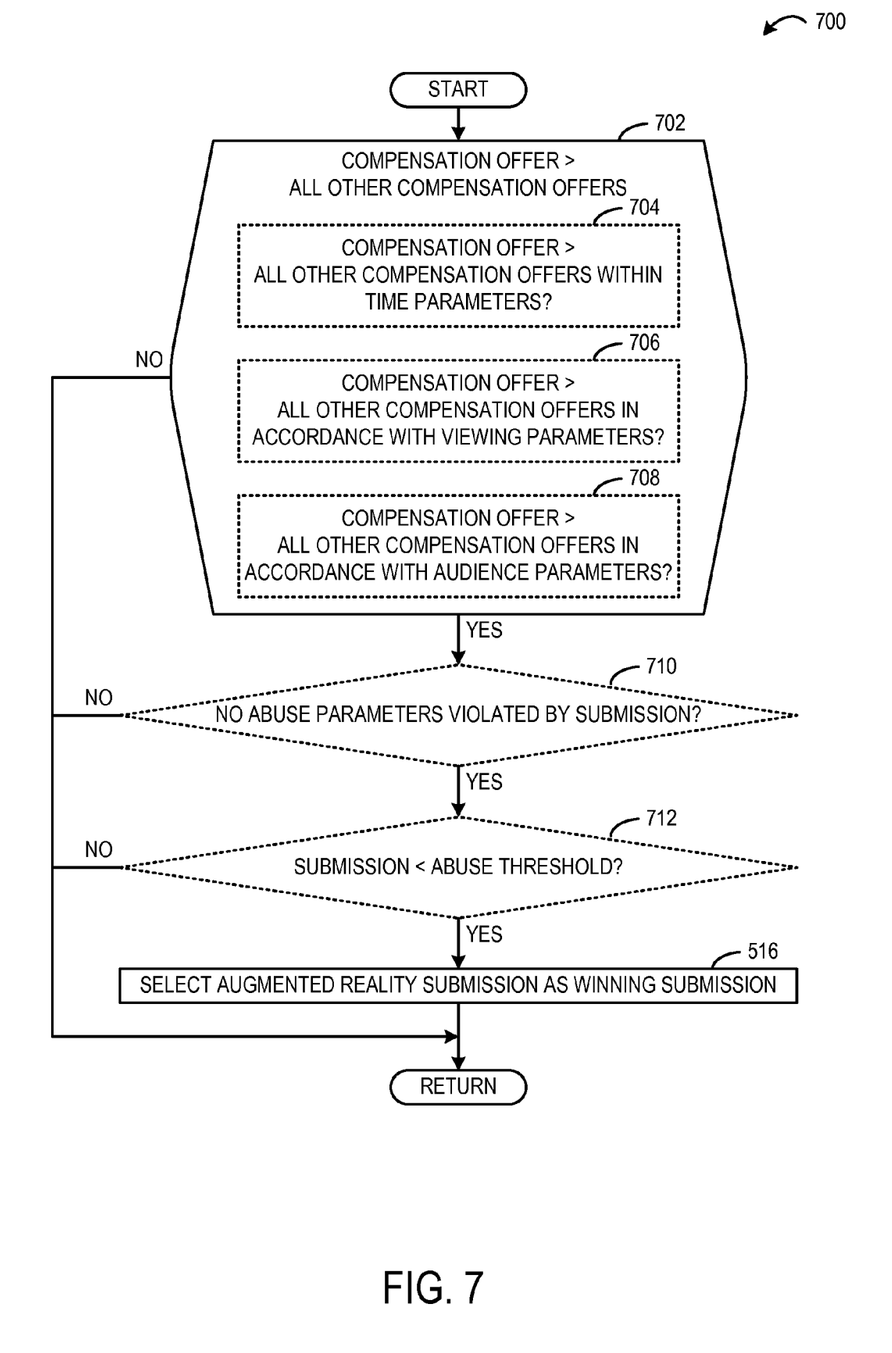
FIG. 7 shows a method for selecting a submission as a winning submission to provide a hologram to an augmented reality device according to an embodiment of the present disclosure.

FIG. 7 shows a method 700 for selecting a submission as a winning submission to provide a hologram to an augmented reality device for presentation to a viewer of a world space object according to an embodiment of the present disclosure. For example, the method 700 may be performed by the augmented reality auction computing machine 302 shown in FIG. 3.

At 702, the method 700 may include determining whether a compensation offer of an augmented reality submission is greater than all other compensation offers for causing other holograms to be presented to a viewer of a world space object. If the compensation offer is greater than all other compensation offers, the method 700 moves to 704. Otherwise, the method 700 returns to other operations.

In some embodiments where the submission includes time parameters for presenting the hologram to a viewer, at 704, the method 700 may include determining whether a compensation offer of an augmented reality submission is greater than all other compensation offers for causing other holograms to be presented to the viewer of the world space object within the time parameters. If the compensation offer is greater than all other compensation offers within the time parameters, the method 700 moves to 706. Otherwise, the method 700 returns to other operations.

In some embodiments where the submission includes viewing parameters for presenting the hologram to a viewer, at 706, the method 700 may include determining whether a compensation offer of an augmented reality submission is greater than all other compensation offers for causing other holograms to be presented to the viewer of the world space object in accordance with the viewing parameters. If the compensation offer is greater than all other compensation offers in accordance with the viewing parameters, the method 700 moves to 708. Otherwise, the method 700 returns to other operations.

In some embodiments where the submission includes audience parameters for presenting the hologram to a viewer, at 708, the method 700 may include determining whether a compensation offer of an augmented reality submission is greater than all other compensation offers for causing other holograms to be presented to the viewer of the world space object in accordance with the audience parameters. If the compensation offer is greater than all other compensation offers in accordance with the audience parameters, the method 700 moves to 710. Otherwise, the method 700 returns to other operations.

In some embodiments where the selection criteria include one or more abuse parameters, at 710, the method 700 may include determining whether none of the one or more abuse parameters are violated by the submission. If the submission does not violate any of the one or more abuse parameters, the method 700 moves to 712. Otherwise, the method 700 returns to other operations.

In some embodiments where the selection criteria include an abuse threshold, at 712, the method 700 may include determining whether the submission exceeds the abuse threshold. If the submission does not exceed the abuse threshold, then the method 700 moves to 516 of method 500 shown in FIG. 5. Otherwise, the method 700 returns to other operations.

At 516, the submission satisfies the selection criteria, and thus is selected as the winning submission. It is to be understood that the above described method is merely one example and any suitable selection criteria may be used to select an augmented reality submission as a winning augmented reality submission.

In some embodiments, the methods and processes described above may be tied to a computing system of one or more computing devices. In particular, such methods and processes may be implemented as a computer-application program or service, an application-programming interface (API), a library, and/or other computer-program product.

Figure 8:
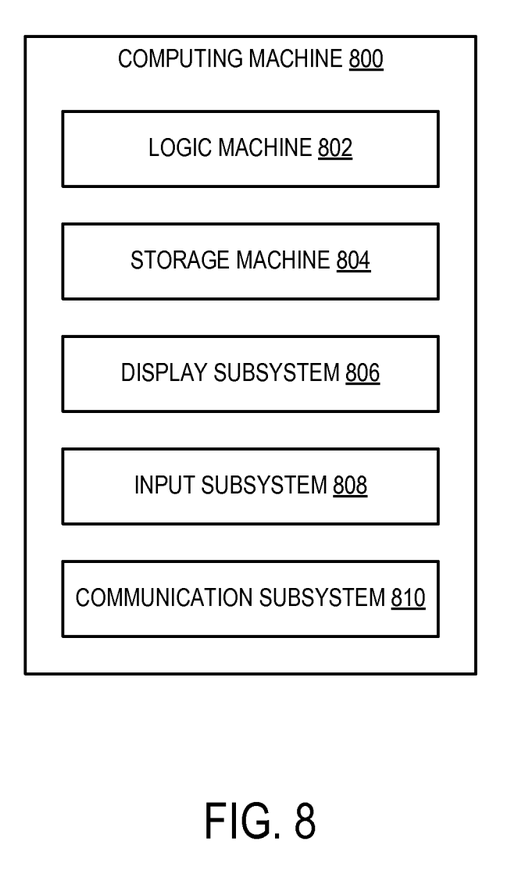
FIG. 8 schematically shows a computing system according to an embodiment of the present disclosure.

FIG. 8 schematically shows a non-limiting embodiment of a computing system 800 that can enact one or more of the methods and processes described above. For example, computing system 800 may be representative of the bidding computing machine 314, the augmented reality auction computing machine 302, or the augmented reality device 324 shown in FIG. 3. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, may be one or more application programs executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer method of auctioning world space for virtual augmentation, comprising:
   receiving, from an owner, an augmented reality submission including a hologram to virtually augment a world space object and a compensation offer for presenting the hologram to a viewer of the world space object;
   selecting the augmented reality submission from the owner as a winning augmented reality submission if the augmented reality submission including the compensation offer satisfies a selection criteria; and
   billing the owner based on the compensation offer and reported consumption of the hologram at an augmented reality device.

2. The method of claim 1, where the world space object is one of a plurality of eligible world space objects, and where the augmented reality submission includes an indication of the world space object selected from a menu of the eligible world space objects.

3. The method of claim 1, further comprising presenting a virtual model of a real world, the virtual model including a virtual simulation of the world space object, where the augmented reality submission includes an indication of the world space object found with a placement tool for fitting the hologram to the virtual simulation.

4. The method of claim 1, where the world space object is one of a plurality of eligible world space objects, and where the method further comprises selecting the world space object based on one or more filters included with the augmented reality submission.

5. The method of claim 1, where the world space object is one of a portion of a real world object at a fixed real world location or a real world space that is fixed relative to an augmented reality device.

6. The method of claim 1, where the hologram is one of a 2D image, a 2D animation, a 3D image, or a 3D animation.

7. The method of claim 1, where the augmented reality submission satisfies the selection criteria if the compensation offer is greater than all other compensation offers for causing other holograms to be presented to a viewer of the world space object.

8. The method of claim 1, where the augmented reality submission further includes time parameters for presenting the hologram to a viewer and the augmented reality submission satisfies the selection criteria if the compensation offer is greater than all other compensation offers for causing other holograms to be presented to the viewer of the world space object within the time parameters.

9. The method of claim 1, where the augmented reality submission further includes viewing parameters for presenting the hologram to a viewer and the augmented reality submission satisfies the selection criteria if the compensation offer is greater than all other compensation offers for causing other holograms to be presented to the viewer of the world space object in accordance with the viewing parameters.

10. The method of claim 1, where the augmented reality submission further includes audience parameters and the submission satisfies the selection criteria if the compensation offer is greater than all other compensation offers for causing other holograms to be presented to viewers in accordance with the audience parameters.

11. The method of claim 1, where the selection criteria include one or more abuse parameters, and where the augmented reality submission satisfies the selection criteria only if none of the one or more abuse parameters are violated by the augmented reality submission.

12. The method of claim 1, where the selection criteria includes an abuse threshold, and where the augmented reality submission satisfies the selection criteria only if the augmented reality submission does not exceed the abuse threshold.

13. A computer method of selectively delivering auctioned virtual augmentations of a world space, the method comprising:
   acknowledging a world space object in a field of view of an augmented reality device;
   identifying a winning augmented reality submission for the world space object based on the winning augmented reality submission including a compensation offer satisfying a selection criteria, the winning augmented reality submission including a hologram to virtually augment the world space object, and the compensation offer for virtually augmenting the world space object with the hologram;
   providing the hologram from the winning augmented reality submission to the augmented reality device;
   receiving consumption information indicating hologram utilization; and
   billing an owner of the winning augmented reality submission according to a compensation offer based on the consumption information.

14. The method of claim 13, wherein the compensation offer includes one or more of a pay-per-view model, a pay-per-interaction model, and a pay-per-viewing time model.

15. The method of claim 13, where identifying the winning augmented reality submission includes selecting an augmented reality submission that satisfies selection criteria including time parameters, viewing parameters, and audience parameters.

16. The method of claim 15, where the selection criteria further includes one or more abuse parameters, and where the augmented reality submission satisfies the selection criteria only if none of the one or more abuse parameters are violated by the augmented reality submission.

17. The method of claim 13, where the world space object is one of a portion of a real world object at a fixed real world location or a real world space that is fixed relative to an augmented reality device, and where the hologram is one of a 2D image, a 2D animation, a 3D image, or a 3D animation.

18. An augmented reality auction system, comprising:
   one or more logic machines; and
   one or more storage machines holding instructions executable by the one or more logic machines to:
      receive a plurality of augmented reality submissions, each augmented reality submission including a hologram to virtually augment a world space object and a compensation offer for presenting the hologram to a viewer of the world space object;
      acknowledge the world space object in a field of view of an augmented reality device;

identify a winning augmented reality submission for the world space object, the winning augmented reality submission satisfying a selection criteria;
provide the hologram from the winning augmented reality submission to the augmented reality device;
report consumption information indicating hologram utilization; and
billing an owner of the winning augmented reality submission according to a compensation offer based on the consumption information.

* * * * *